United States Patent
Ringel

Patent Number: 5,932,366
Date of Patent: Aug. 3, 1999

[54] SOLID ELECTROLYTE HIGH TEMPERATURE FUEL CELL

[75] Inventor: Helmut Ringel, Niederzier, Germany

[73] Assignee: Forschungszentrum Jülich GmbH, Germany

[21] Appl. No.: 08/808,792

[22] Filed: Feb. 28, 1997

Related U.S. Application Data

[63] Continuation-in-part of application No. PCT/DE95/01168, Aug. 29, 1995.

[30] Foreign Application Priority Data

Sep. 3, 1994 [DE] Germany ............................ 44 31 510

[51] Int. Cl.⁶ .................................................. H01M 8/12
[52] U.S. Cl. ................................ 429/26; 429/32; 429/39
[58] Field of Search ................................... 429/26, 32, 39

[56] References Cited

U.S. PATENT DOCUMENTS

| | | | |
|---|---|---|---|
| 4,684,582 | 8/1987 | Granata et al. | 429/39 |
| 4,686,159 | 8/1987 | Miyoshi et al. | 429/26 X |
| 4,743,518 | 5/1988 | Romanowski | 429/39 X |
| 5,185,219 | 2/1993 | Ishihara et al. | 429/32 X |

*Primary Examiner*—Stephen Kalafut
*Attorney, Agent, or Firm*—Klaus J. Bach

[57] ABSTRACT

In a solid electrolyte high temperature fuel cell arrangement comprising several fuel cells arranged upright directly adjacent one another and connected in series wherein each cell is defined between opposite planar connecting plates defining therebetween a chamber in which a solid electrolyte element with opposite cathode and anode surfaces is disposed in spaced relationship from the side walls of the connecting plates so as to form air and fuel gas channels with top discharge openings at opposite sides of the solid electrolyte element, the planar connecting plates include flow passages for conducting at least one of the air and fuel gas to the bottom of the air and gas channels, respectively.

4 Claims, 5 Drawing Sheets

SOLID ELECTROLYTE HIGH TEMPERATURE FUEL CELL

This is a continuation-in-part application of international patent application PCT/DE95/01168 dated Aug. 29, 1995 designating the US and claiming priority of the German application P 44 31 510.4 of Sep. 03, 1994.

BACKGROUND OF THE INVENTION

The present invention relates to a solid electrolyte high-temperature fuel cell arrangement consisting of several fuel cells which are arranged directly adjacent one another and connected in series and which are formed by adjacently disposed planar connecting plates with solid electrolyte elements arranged therebetween and wherein the connecting plates of two adjacent cells provide for electrical connections between the cathode of one cell and the anode of the other cell and include gas channels and gas admission means as well as air channels and air admission means.

In a fuel cell, fuel gas is converted electrochemically with oxygen whereby electrical energy is directly generated. The reaction partners are supplied in different channels, that are the fuel and air channels, separated by the ceramic solid electrolyte element which is provided at both sided with electrodes. During operation electrons are emitted at the fuel side electrode of the solid electrolyte whereas electrons are absorbed at the oxygen side electrode whereby a potential difference is generated between the two electrodes. The solid electrolyte separates the reactants, it transfers the charge in the form of ions and, at the same time, presents an electron short circuit between the two electrodes of the solid electrolyte. For this purpose, the solid electrolyte needs to have a low conductivity for electrons but, at the same time, a high conductivity for ions.

In contrast to low temperature fuel cells, solid electrolyte high temperature fuel cells are suitable for the conversion of not only hydrogen but also for the conversion of hydrocarbons such as natural gas or propane which can be stored in liquid form. With solid electrolyte, high temperature fuel cells high power densities on the order of several 100 mW/cm$^2$ can be achieved. A single high temperature fuel cell generates an idle voltage of about 0.7. For higher voltages a serial arrangement of several single cells is required.

A solid electrolyte high temperature fuel cell arrangement of the type referred to initially is known for example from DE-OS-39 35 722. Herein four stacks of plates are mounted in a horizontal arrangement in a frame of insulating material wherein gas and air are supplied to the fuel cells and, respectively, removed therefrom through the frame.

Further solid electrolyte fuel cell arrangements are known from U.S. Pat. No. 4,476,198, DE 40 09 138 and DE 34 37 354.

DE 40 09 138 discloses a solid electrolyte high temperature fuel cell module comprising several serially arranged planar solid electrolyte high temperature fuel cells which are disposed directly on one another. A bi-polar plate is provided which electrically interconnects the cathode of one cell and the anode of an adjacent cell. Also, gas and air channels are formed by the bipolar plate. Solid electrolyte plates have cathode material at one side and anode material at the other. In order to prevent thermal tensions, the bipolar plate consists of a metallic conductive alloy whose thermal expansion coefficient corresponds to that of the solid electrolyte element.

The European patent application 0 473 540 discloses a fuel cell arrangement wherein the fuel cell elements are disc-shaped. By a particular arrangement of the gas channels a heat exchange between the supply air and the exhaust air and gas is achieved. A subsequent combustion of the gas and the air can be provided for immediately following the discharge of the gas and the air from the fuel cells.

However, because of the circular disc-like arrangement, the gas flow is radial whereby the gas flow density increases or decreases rapidly with the radius. As a result, the heat exchanger and also, the gas reactions within the cell cannot be designed for a particular gas speed.

Furthermore, with a combustion of the gas leaving the cell stack the cells are disposed practically in the center of the flame whereby the cells are heated to unnecessarily high temperatures. Since the flame extends radially outwardly and the combustion gas rises by thermal effects, the upper part of the cell stack is heated to a much greater degree than the lower part. Such uneven heating results in high thermal tensions in the cell stack.

Another disadvantage results from the unavoidable gas/air parallel flow at the electrolyte plate (PEN-plate) which is provided at one side with the positive cathode and at the other side with the negative anode, also a gas/air cross-flow arrangement is impossible to establish. A gas admission in the center, but particularly an air admission at the large outer circumference of the cell stack is very difficult.

Another big problem with the fuel cell technology is the sealing of the joints. In the fuel cell of the last mentioned patent application for example the sealing problems are aggravated because the lower joints are more heavily loaded than the upper joints and because bending stresses may occur at the clamping locations.

It is the object of the present invention to provide a solid electrolyte high temperature fuel cell of the type referred to above without however the disadvantages mentioned above.

SUMMARY OF THE INVENTION

In a solid electrolyte high temperature fuel cell arrangement comprising several fuel cells arranged upright and directly adjacent one another and connected in series wherein each cell is formed between opposite planar connecting plates defining therebetween a chamber in which a solid electrolyte element with opposite cathode and anode surfaces is disposed in spaced relationship from the side walls of the connecting plates so as to form air and fuel gas channels with top discharge openings at opposite sides of the solid electrolyte element, the planar connecting plates include flow passages for conducting at least one of the air and fuel gas to the bottom of the air and gas channels, respectively.

Since the after-burn gas openings are directed upwardly and the flames extend upwardly from the top end of the fuel cell arrangement, the undesirable heating of the fuel cell stack is prevented.

The vertical arrangement of the fuel cells further facilitates the sealing of the joints between the various plates at the relatively high temperatures (1000° C.) since assuming that there is no rigid soldering joint, each joint is sealed with the same compression force by the application of side compression forces. The compression forces can be adapted to the respective cell temperatures. The compression forces can be maintained at relatively low values at room temperature and can be increased at high temperatures when the sealing material is sufficiently softened to accommodate the required sealing pressure In this manner, fractures of the highly brittle and extremely sensitive solid electrolyte plates can be prevented.

The fuel cell arrangement according to the invention makes it possible to arrange a heat exchanger immediately adjacent to the upwardly open ends of the air and gas channels. The supply air is conducted through the heat exchanger in which the air is heated before admission to the fuel cells. It is also possible, and even suitable, to conduct the gas through the heat exchanger before admission to the fuel cells.

The air or fuel gas is conducted to the bottom of the fuel cell arrangement according to the invention through a connecting plate with an internal heat exchange which is provided by flow passages which are formed in the connecting plate between the gas and the air channels and which lead to the air or, respectively, fuel gas channel. Supply air or fuel gas is supplied into the flow passages for a heat exchange between the supply air or fuel gas and the air and, respectively, fuel gas flowing upwardly in the adjacent air and fuel gas channels.

In still a further embodiment of the fuel cell arrangement according to the invention round disc-like plates are utilized as connecting plates since with these plates temperature strains in the material are the smallest at the required operating temperature of about 1000° C.

DESCRIPTION OF PREFERRED EMBODIMENTS

Figure 1:
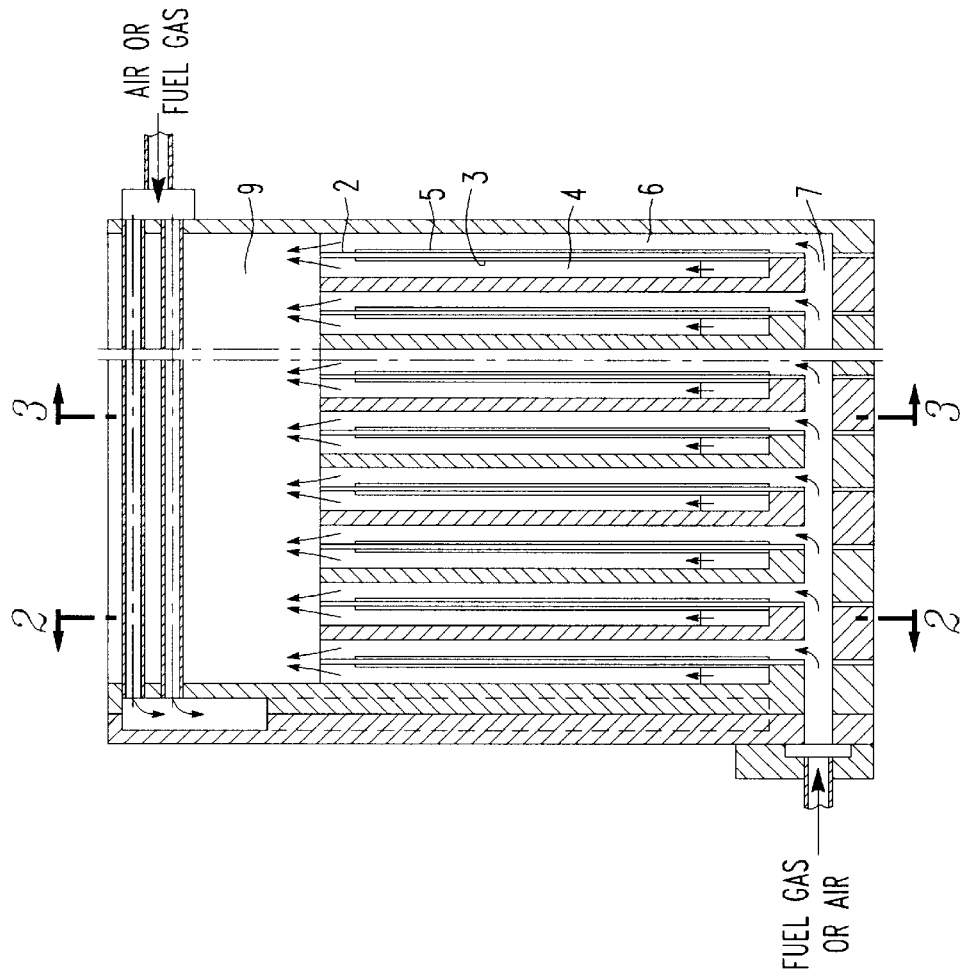
FIG. 1 is a cross-sectional view of fuel cell arrangement according to the invention.
Figure 4:
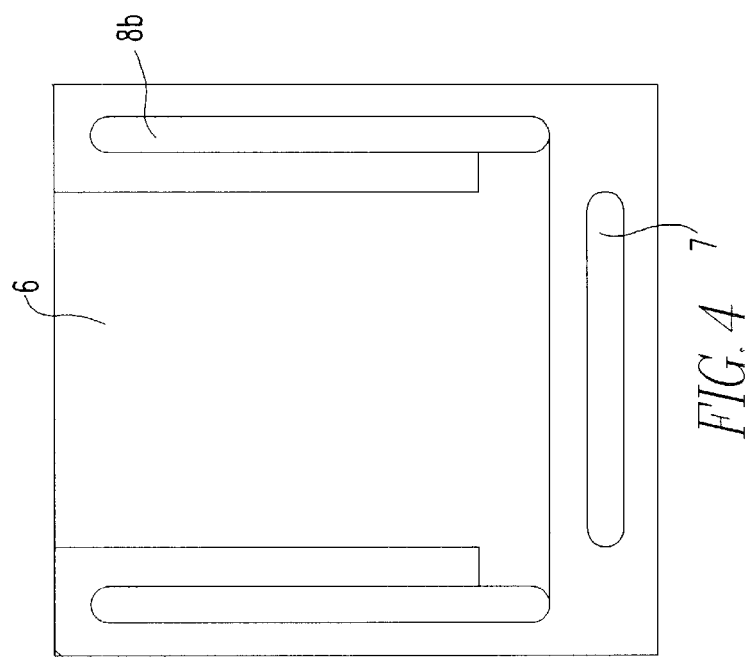
FIG. 4 shows one side of a connecting plate of a fuel cell arrangement.
Figure 3:
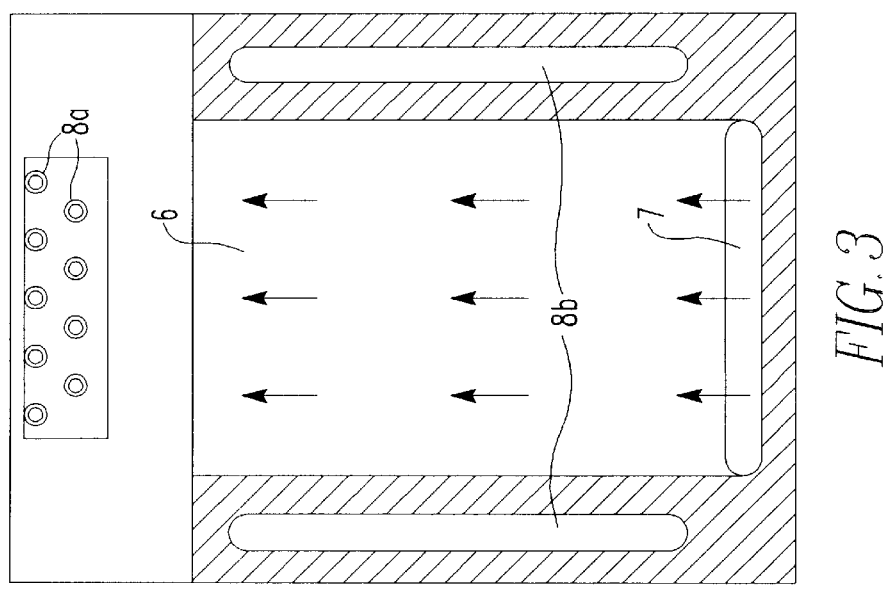
FIG. 3 is a cross-sectional view taken along line 3—3 of FIG. 1.
Figure 5:
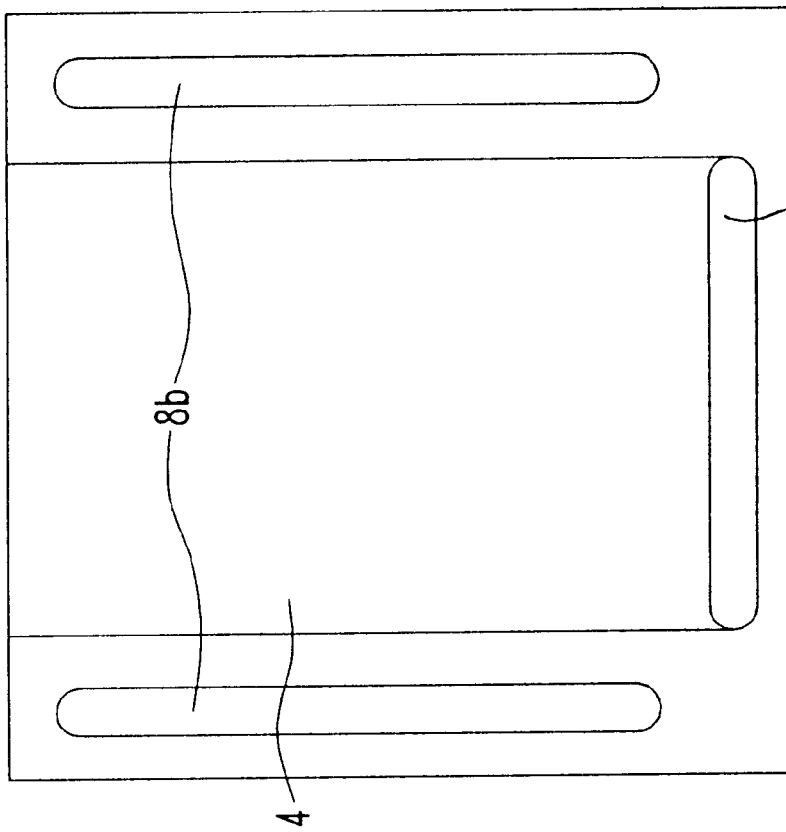
FIG. 5 shows the other side of the connecting element.
Figure 6:
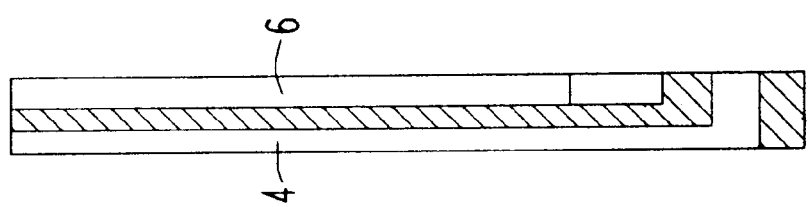
FIG. 6 shows the connecting element in cross-section.
Figure 8:
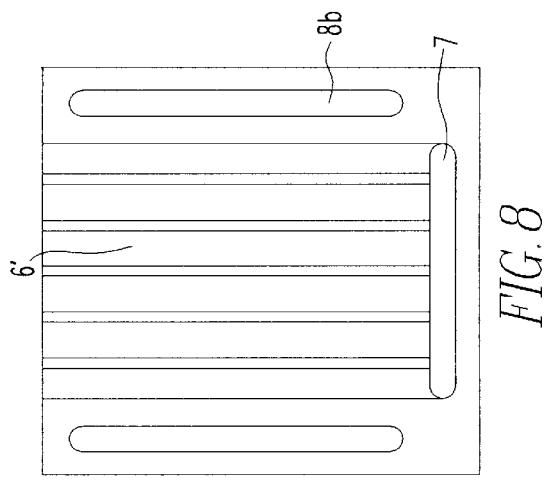
FIG. 8 shows the other side of the connecting element shown in FIG. 7.
Figure 9:
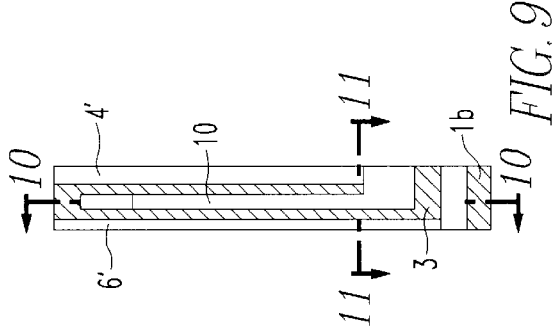
FIG. 9 is a cross-sectional of the connecting element of FIGS. 7 and 8.

The fuel cell arrangement as shown in FIG. 1 comprises a number of serially arranged fuel cells disposed adjacent one another. They are formed by planar connecting plates disposed adjacent one another. One such connecting plate is shown in FIGS. 4, 5 and 6. A solid electrolyte element 2 is disposed between adjacent connecting plates. The solid electrolyte element 2 has on one side a cathode 3 along which an air channel 4 is formed and on the opposite side an anode 5 along which a gas channel 6 is formed.

The connecting plates are arranged vertically and the air and gas channels 4 and 6 are open at the top.

Figure 2:
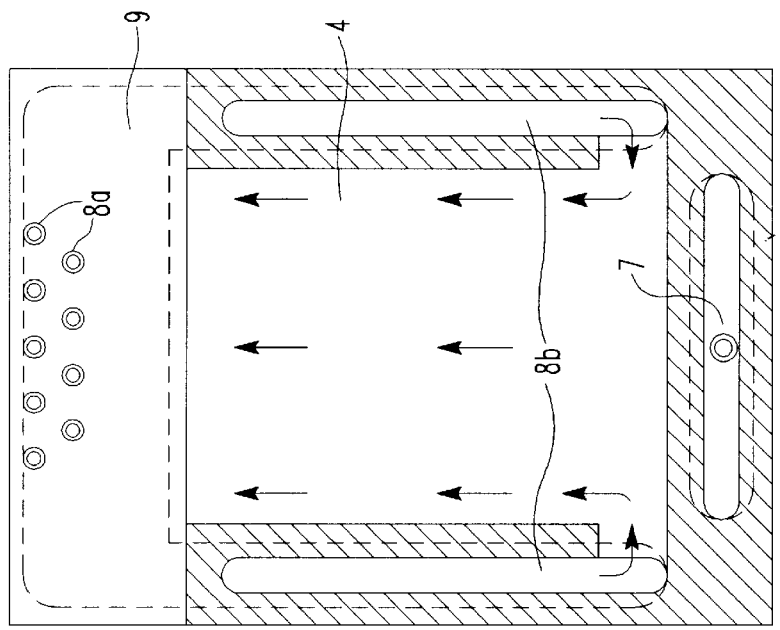
FIG. 2 is a cross-sectional view taken along line 2—2 of FIG 1.

As shown in FIGS. 1 and 2, the gas is supplied by way of the gas supply passage 7 whereas the air is conducted into the cells through heat exchangers 8a disposed above the fuel cells through side channels 8b to the lower ends of the air channels 4 into which the air enters from opposite sides.

Above the air and gas channels 4 and 6, which are open at the top, there is the combustion chamber 9 with the heat exchanger 8a for the supply air.

Figure 11:
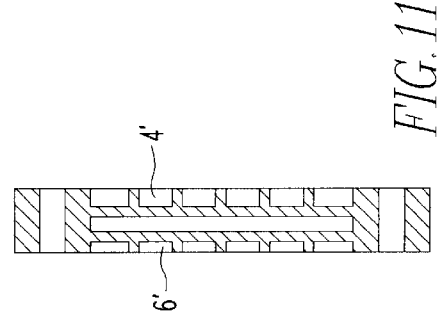
FIG. 11 is a cross-sectional view of the connecting element taken along line 11—11 of FIG. 9.
Figure 7:
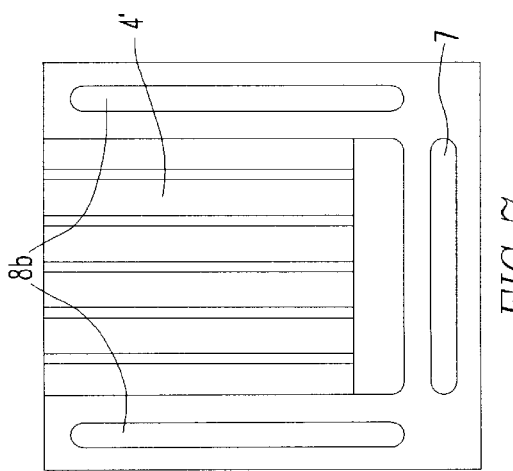
FIG. 7 shows one side of a connecting element which includes a channel serving as a heat exchanger.
Figure 10:
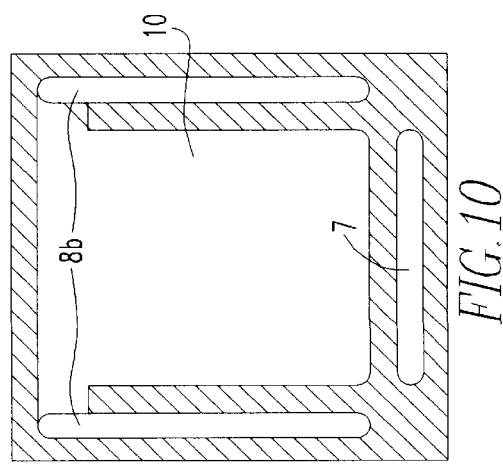
FIG. 10 is a cross-sectional view of the connecting element taken along line 10—10 of FIG. 9.
Figure 12:
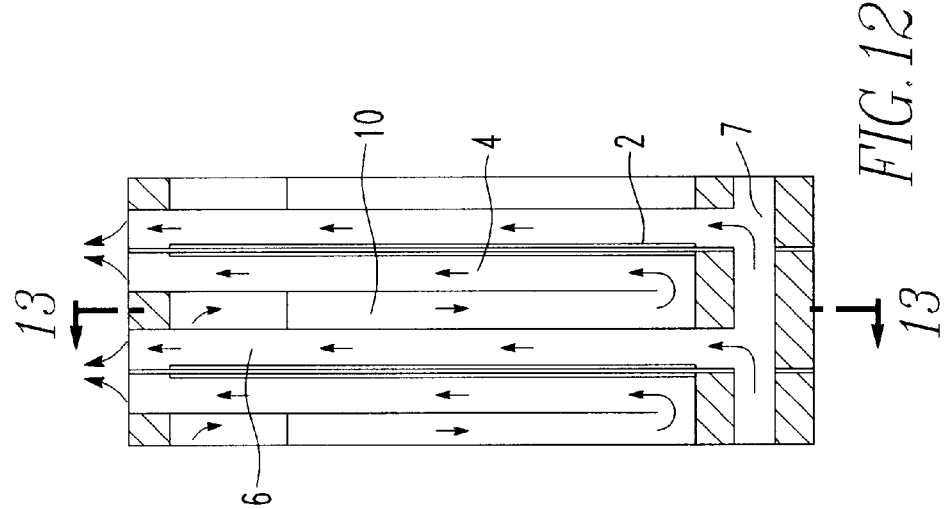
FIG. 12 is a cross-sectional view of a fuel cell arrangement including a connecting element.
Figure 13:
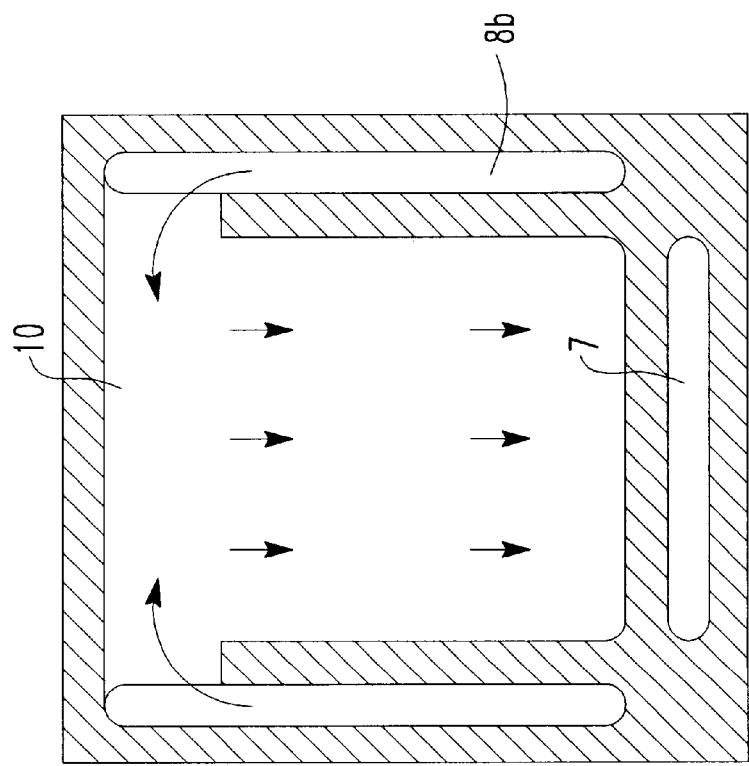
FIG. 13 is a cross-sectional view of the fuel cell arrangement taken along line 13—13 of 12.

FIGS. 7, 8, 9, 10 and 11 show in detail the connecting plate 1b for the fuel cell arrangement shown in FIGS. 12 and 13. The connecting plate has a channel 10 which has openings at the top sides and communicates at the bottom with the air channel 4 formed at one side of the connecting plate 1b. At its opposite side the connecting plate 1b defines a fuel gas channel 6.

The air channel 4 and the fuel gas channel 6 are divided into separate channels 4' and 6', respectively, as can be seen in the cross-sectional view of FIG. 11.

As shown in FIGS. 12 and 13, the air downflow passage 10 is disposed between the air upflow channel 4 and the gas upflow channel 6 and between adjacent solid electrolyte elements 2 so that there is a heat exchange between the upwardly flowing air and fuel gas and the downwardly flowing air.

Instead of being supplied from the side channels 8b to the lower end of the air channels 4, the air is conducted as shown in FIGS. 12 and 13 from the side channels 8b to the top of the air downflow passages 10.

It is pointed out however that, although the air is preferably preheated, it is also possible to preheat the fuel gas and conduct it downwardly through the passages 10 in heat exchange relatinship with with the upwardly flowing air and fuel gas in the channels 4 and 6. Then, of course, the downflow the downflow passage 10 in the connecting plate 1b would be at its bottom end in communication with the upflow channel 6.

What is claimed is:

1. A solid electrolyte high temperature fuel cell arrangement comprising at least two fuel cells arranged upright directly adjacent one another and connected in series, each cell being defined between opposite planar connecting plates having side walls defining a chamber therebetween and a solid electrolyte element disposed in said chamber in spaced relationship from the side walls of said connecting plates so as to form air and fuel gas channels at opposite sides of said solid electrolyte element, said solid electrolyte element having opposite cathode and anode surfaces in contact with the respective planar connecting plates such that a connecting plate between two adjacent cells electrically connects the cathode of one of said two adjacent cells with the anode of the other, means for supplying air to the bottom of the air channels and fuel gas to the bottom of the fuel gas channels at opposite sides of said solid electrolyte element, said air and fuel gas channels having at the top discharge openings leading to a combustion space at the top of said fuel cells, said connecting plates including gas passages disposed between said air and gas channels for conducting gas downwardly to the bottom of at least one of said air and fuel gas channels at the sides of said solid electrolyte elements in heat exchange relation with the air and fuel gas flowing upwardly through the adjacent air and gas channels.

2. A solid electrolyte high temperature fuel cell arrangement according to claim 1, wherein a first heat exchanger is provided in flow communication with said combustion space and the air supplied to the bottom of said air channels through the air passages in said connecting plates is conducted through said first heat exchanger to be heated by the air and fuel gas burnt in said combustion space.

3. A solid electrolyte high temperature fuel cell arrangement according to claim 2, wherein a second heat exchanger is provided in flow communication with said combustion space and the fuel gas supplied to the bottom of said fuel gas channels is conducted through said second heat exchanger to be heated by the air and fuel gas burnt in said combustion space.

4. A solid electrolyte high temperature fuel cell arrangement according to claim 1, wherein said connecting plates include air supply passages connected to a first heat exchanger for heating the air supplied to the bottom of said air channels through said connecting plates and fuel gas passages connected to a second heat exchanger for heating the fuel gas supplied to the bottom of said fuel gas channels.

* * * * *